(12) United States Patent
Nakayama et al.

(10) Patent No.: US 8,098,042 B2
(45) Date of Patent: Jan. 17, 2012

(54) CHARGING SYSTEM FOR WALKING ROBOT AND CHARGING METHOD THEREFOR

(75) Inventors: Takashi Nakayama, Wako (JP); Koji Okazaki, Wako (JP); Masaaki Muromachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 609 days.

(21) Appl. No.: 12/267,011

(22) Filed: Nov. 7, 2008

(65) Prior Publication Data
US 2009/0121673 A1    May 14, 2009

(30) Foreign Application Priority Data
Nov. 9, 2007  (JP) .................................. 2007-291553

(51) Int. Cl.
*H02J 7/00* (2006.01)
(52) U.S. Cl. ........ 320/107; 320/108; 320/109; 320/112; 320/113; 320/114
(58) Field of Classification Search ........... 320/106–108
See application file for complete search history.

(56) References Cited

U.S. PATENT DOCUMENTS

| 7,642,745 B2 * | 1/2010 | Kaneko et al. | 320/107 |
| 2007/0216347 A1 * | 9/2007 | Kaneko et al. | 320/107 |

FOREIGN PATENT DOCUMENTS

| JP | 2001-179663 | 7/2001 |
| JP | 2007245332 A | 9/2007 |

* cited by examiner

*Primary Examiner* — Huy Q Phan
*Assistant Examiner* — Son Le
(74) *Attorney, Agent, or Firm* — Rankin, Hill & Clark LLP

(57) ABSTRACT

A charging system for a walking robot which charges a battery mounted on the walking robot by connecting a power supplying connector provided in a charging station to a power receiving connector in the walking robot, wherein the walking robot is capable of moving without significant restrictions during charging. The charging system includes a lock mechanism for locking the power supplying connector to the power receiving connector. A connector holder holds the power supplying connector detachably, an advancing/retracting mechanism advances and retracts the connector holder in the anteroposterior direction, and a lock operation mechanism performs a lock operation and an unlock operation of the lock mechanism via the connector holder. After an advance of the connector holder, the lock mechanism performs the lock operation to lock the power supplying connector to the power receiving connector. Thereafter, the connector holder is retracted out of the power supplying connector.

7 Claims, 7 Drawing Sheets

CHARGING SYSTEM FOR WALKING ROBOT AND CHARGING METHOD THEREFOR

BACKGROUND OF THE INVENTION

1. Field of the Invention

The present invention relates to a charging system for use in charging a battery mounted on a walking robot and a method of charging the walking robot using the charging system.

2. Description of the Related Art

Conventionally, a charging system for a walking robot is disclosed as described below in Japanese Patent Application Laid-Open No. 2001-179663. A power receiving connector connected to a battery mounted on the walking robot is provided in a proper place of the walking robot and a charging station provided with a charging power supply and a power supplying connector connected thereto is installed within a range that the walking robot is capable of moving. The power receiving connector is connected to the power supplying connector on the charging station by the movement of the walking robot and then the charging power supply charges the battery.

When the remaining capacity of the battery is reduced, this type of charging system is capable of automatically charging the battery after the walking robot moves to the installation location of the charging station by itself to connect the power receiving connector to the power supplying connector.

In the foregoing conventional embodiment, the power supplying connector is fixed to the charging station and thus the walking robot is restricted by the connection between the power receiving connector and the power supplying connector during charging, which significantly limits the degree of freedom of motion of the walking robot. As a result, the walking robot is not capable of effectively showing the entertainment ability thereof during charging, thereby disappointing viewers.

SUMMARY OF THE INVENTION

In view of the foregoing, it is an object of the present invention to provide a charging system for a walking robot and a charging method therefor enabling the walking robot to move without significant restrictions during charging.

To solve the above problem, according to an aspect of the present invention, there is provided a charging system for a walking robot which is provided with a charging station including a charging power supply and a power supplying connector connected thereto via a cable and which charges a battery mounted on the walking robot from the charging power supply by connecting the power supplying connector to a power receiving connector provided in the walking robot, the charging system comprising a lock mechanism capable of locking the power supplying connector to be connected to the power receiving connector, wherein the charging station is provided with a connector holder which holds the power supplying connector detachably, an advancing/retracting mechanism which advances and retracts the connector holder in the anteroposterior direction, and a lock operation mechanism which performs a lock operation and an unlock operation of the lock mechanism via the connector holder, with the connecting direction of the power supplying connector to the power receiving connector defined as the front side and the reverse direction defined as the rear side.

According to another aspect of the present invention, there is provided charging method for a walking robot using the foregoing charging system, the charging method comprising the steps of: causing the power receiving connector to face the front of the power supplying connector by means of the motion of the walking robot; advancing the connector holder by the advancing/retracting mechanism with the power supplying connector held by the connector holder; locking the power supplying connector to be connected to the power receiving connector by performing a lock operation of the lock mechanism by means of the lock operation mechanism; charging the battery mounted on the walking robot from the charging power supply; pulling the connector holder out of the power supplying connector by retracting the connector holder by the advancing/retracting mechanism before or after starting the battery charge; advancing the connector holder by the advancing/retracting mechanism after completion of the battery charge; releasing the lock of the power supplying connector to the power receiving connector by performing an unlock operation of the lock mechanism by means of the lock operation mechanism to cause the connector holder to hold the power supplying connector; and retracting the connector holder by the advancing/retracting mechanism to pull the power supplying connector out of the power receiving connector.

According to the present invention, the power supplying connector is connected to the power receiving connector and is locked to the state by advancing the connector holder by the advancing/retracting mechanism and performing the lock operation of the lock mechanism by means of the lock operation mechanism. Thereafter, the connector holder is retracted, by which the connector holder is pulled out of the power supplying connector. In this state, the power supplying connector is connected to the charging station only via a cable. This enables the walking robot to move freely within the range as long as the cable is not stretched completely with the power supplying connector connected to the power receiving connector. Therefore, it is possible to effectively show the entertainment ability of the walking robot also during charging and thereby to entertain viewers.

After the completion of the charge, the lock of the power supplying connector to the power receiving connector is released and thereby the connector holder holds the power supplying connector by advancing the connector holder by the advancing/retracting mechanism again and then performing the unlock operation of the lock mechanism by means of the lock operation mechanism. Thereafter, the power supplying connector is pulled out of the power receiving connector by retracting the connector holder. This enables the walking robot to be completely free.

In the charging system of the present invention, the advancing/retracting mechanism includes a direct-acting type driving source and a movable frame which is advanced and retracted in the anteroposterior direction by the direct-acting type driving source, and a support frame which supports the connector holder is connected to the movable frame so as to be floatable vertically or horizontally via a floating mechanism. Preferably, at least one of the power supplying connector and the power receiving connector is provided with a guide section for correcting misalignment between the power supplying connector and the power receiving connector.

According thereto, even if the power receiving connector is misaligned vertically or horizontally relative to the power supplying connector when the power receiving connector is faced to the front of the power supplying connector by the motion of the walking robot, the power supplying connector floats vertically or horizontally due to a correcting force for the misalignment caused by the guide section during the advance of the movable frame, and thereby the power supplying connector is position-controlled concentrically with the power receiving connector. This prevents a connection error between the power supplying connector and the power receiving connector which may be caused by misalignment.

In the above, preferably the floating mechanism includes a rod longitudinal in the anteroposterior direction, a universal joint which is provided in the movable frame to support the rod in the middle portion thereof so as to be tiltable vertically or horizontally, a first elastic support member which is provided in the movable frame to support the rear end of the rod elastically and displaceably in the vertical or horizontal direction, and a second elastic support member which is provided at the front end of the rod to support the support frame so as to be tiltable elastically in the vertical or horizontal direction.

According thereto, the correcting force for the misalignment caused by the guide section causes the rod to tilt around the universal joint with good followability. If the support frame is rigidly connected to the front end of the rod in this situation, a tilt of the rod causes the axis of the power supplying connector to be inclined relative to the axis of the power receiving connector, which inhibits the power supplying connector from engaging with the power receiving connector. On the other hand, in the above configuration, the support frame tilts in a direction opposite to the tilt direction of the rod due to a deformation of the second elastic support member and thereby the axis of the power supplying connector matches the axis of the power receiving connector. Therefore, it is possible to correct the misalignment between the power receiving connector and the power supplying connector with good followability and to connect the power supplying connector to the power receiving connector reliably.

Moreover, in the charging system of the present invention, the power receiving connector includes a power receiving connector body connected to the battery and a cylindrical power receiving connector housing which is longitudinal in the anteroposterior direction to house the power receiving connector body. The power supplying connector includes a power supplying connector body connected to the charging power supply via the cable and a power supplying connector housing which is formed into a cylinder longitudinal in the anteroposterior direction to house the power supplying connector body so as to be relatively rotatable and which is freely insertable into or removable from the power receiving connector housing. The connector holder is formed into a cylinder longitudinal in the anteroposterior direction to receive the power supplying connector housing so that the power supplying connector housing is freely insertable into and removable from the connector holder and is rotatably supported by the support frame advanced and retracted by the advancing/retracting mechanism. The lock mechanism has a spiral cam groove formed on one of the power supplying connector housing and the power receiving connector housing and a cam pin engaging with the cam groove and fixed to the other of the power supplying connector housing and the power receiving connector housing. When the power supplying connector housing is rotated in a lock direction which is one circumferential direction, the power supplying connector body is connected to the power receiving connector body by advancing the power supplying connector housing relative to the power receiving connector housing. When the power supplying connector housing is rotated in an unlock direction which is the other circumferential direction, the power supplying connector body is pulled out of the power receiving connector body by retracting the power supplying connector housing relative to the power receiving connector housing in a cam mechanism. Preferably, the lock operation mechanism includes a rotary drive source for rotating the connector holder in the lock direction and in the unlock direction and a rotation transmission means for rotating the power supplying connector housing along with the rotation of the connector holder.

According thereto, when the connector holder is rotated in the lock direction by the rotary drive source after advancing the connector holder by the advancing/retracting mechanism and engaging the cam pin with the end of the cam groove, the power supplying connector housing also rotates in the lock direction via the rotation transmission means and the power supplying connector housing advances relative to the power receiving connector housing by the action of the cam groove, by which the power supplying connector body is connected to the power receiving connector body and is locked to the state. In other words, the lock operation of the lock mechanism is performed by the rotation of the connector holder in the lock direction. The power supplying connector body is relatively rotatable to the power supplying connector housing, and therefore even if the power supplying connector housing advances with rotation, the power supplying connector body advances without rotation and is easily connected to the power receiving connector body.

Moreover, when the connector holder is rotated in the unlock direction by the rotary drive source, the power supplying connector housing also rotates in the unlock direction via the rotation transmission means and the power supplying connector housing retracts relative to the power receiving connector housing by the action of the cam groove, by which the power supplying connector body is pulled out of the power receiving connector body. In other words, the unlock operation of the lock mechanism is performed by the rotation of the connector holder in the unlock direction. Since the lock operation and the unlock operation of the lock mechanism are achieved only by the rotation of the connector holder in the lock direction and in the unlock direction as described above, the structure of the lock operation mechanism is simplified. Furthermore, the lock mechanism is formed by a cam mechanism with a simple structure including the cam groove and the cam pin, which contributes to cost reduction.

Moreover, the rotation transmission means includes a guide groove extending in the anteroposterior direction, which is formed in one of the connector holder and the power supplying connector housing, and a guide pin engaging with the guide groove, which is fixed to the other of the connector holder and the power supplying connector housing. A flex groove is formed so as to flex in a relative rotational direction of the guide pin to the guide groove when the connector holder is rotated in the unlock direction at an end of the guide groove that the guide pin reaches when the power supplying connector housing is inserted into the connector holder. The anteroposterior groove length of the flex groove is set so as to allow the guide pin to move by a given stroke in the anteroposterior direction in the flex groove. Preferably, there is provided a biasing means which biases the power supplying connector housing forward relative to the connector holder.

According thereto, the rotation transmission means has a compact and simple structure. Moreover, when the connector holder is rotated in the unlock direction, the guide pin finally engages with the flex groove of the guide groove. Thereby, the power supplying connector housing is retained relative to the connector holder, by which the power supplying connector housing is reliably pulled out of the power receiving connector housing by the retraction of the housing holder.

In this regard, if the anteroposterior distance between the power receiving connector housing and the power supplying connector housing is shorter than the normal distance when the power receiving connector is faced to the front of the power supplying connector by the motion of the walking robot, the cam pin engages with the end of the above-mentioned cam groove in the middle of the advancing movement of the connector holder and thereby the power supplying connector housing does not advance any more relative to the power receiving connector housing. In this situation, a forward strong pushing force will be applied to the walking robot via the power receiving connector housing from the power supplying connector housing due to a subsequent advance of the connector holder and thereby the walking robot could be pushed down forward. For this situation, according to the above configuration, the power supplying connector housing is capable of retracting by the given stroke against the biasing force of the biasing means relative to the connector holder. Accordingly, if the cam pin engages with the end of the cam groove in the middle of the advancing movement of the connector holder, the power supplying connector housing retracts relative to the connector holder. This prevents the forward strong pushing force from being applied to the walking robot.

Furthermore, preferably the charging system further comprises a whirl-stop means which stops the whirl of the power supplying connector body relative to the support frame. According thereto, the whirl-stop means is used to prevent the power supplying connector body from being rotationally misaligned from the phase where the power supplying connector body is connectable to the power receiving connector body due to vibration or the like during the advance of the connector holder, which enables the power supplying connector body to be reliably connected to the power receiving connector body.

DETAILED DESCRIPTION OF THE PREFERRED EMBODIMENTS

Figure 1:
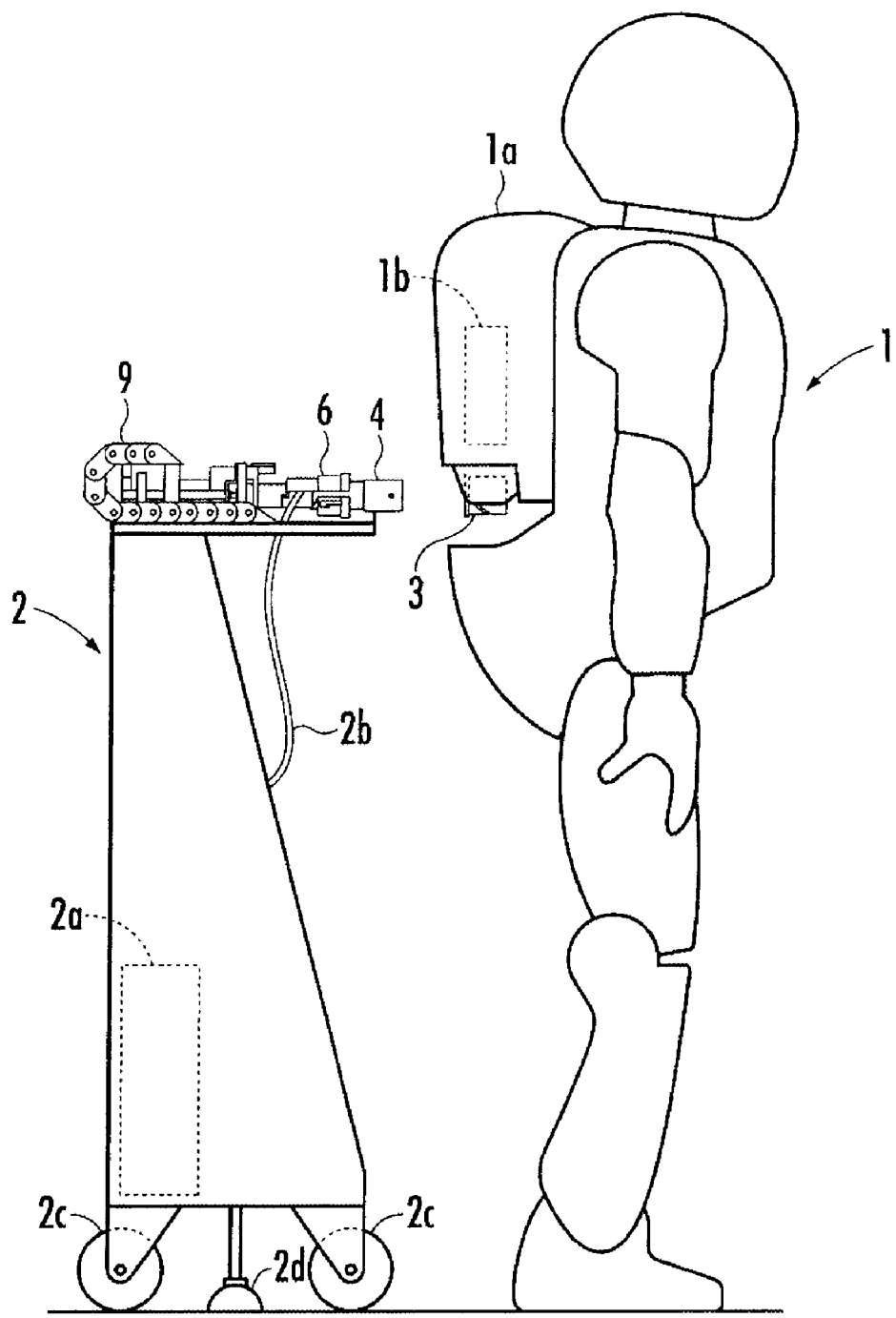
FIG. 1 is a side view of a charging system according to an embodiment of the present invention.

Referring to FIG. 1, a reference numeral 1 designates a humanoid walking robot and a reference numeral 2 designates a charging station for the walking robot 1. A control box 1a on the back of the walking robot 1 houses a battery 1b, and a power receiving connector 3 connected to the battery 1b is provided at the bottom of the control box 1a. Moreover, the charging station 2 is provided with a charging power supply 2a and a power supplying connector 4 connected thereto via a cable 2b. When the remaining capacity of the battery 1b is reduced, the walking robot 1 moves to the installation location of the charging station 2 by itself to charge the battery 1b from the charging power supply 2a by connecting the power receiving connector 3 to the power supplying connector 4. The charging station 2 is freely movable on casters 2c attached to the bottom thereof. Moreover, a stopper 2d is screwed into the charging station 2 at the bottom thereof so as to freely move up and down. Thereby, the charging station 2 is installed in a predetermined installation location by lowering the stopper 2d.

Hereinafter, the power receiving connector 3, the power supplying connector 4, and the charging station 2 will be described in detail with the connecting direction of the power supplying connector 4 to the power receiving connector 3 defined as the front side and the reverse direction defined as the rear side.

Figure 2:
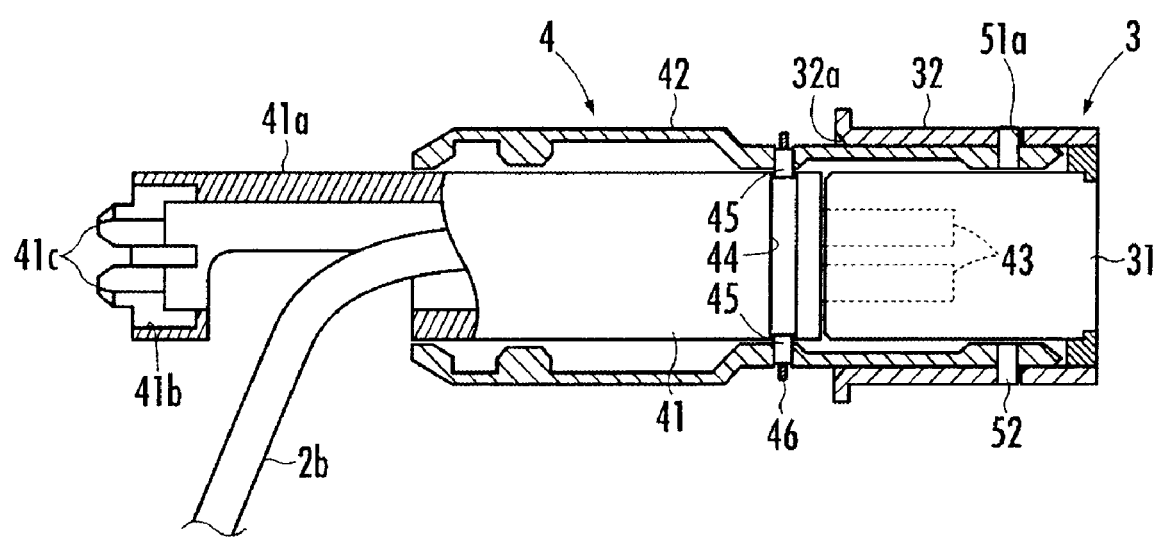
FIG. 2 is a cross section illustrating a connection state between a power receiving connector of the charging system according to the embodiment and a power supplying connector thereof.

Referring to FIG. 2, the power receiving connector 3 includes a power receiving connector body 31 connected to the battery 1b and a cylindrical power receiving connector housing 32, which is longitudinal in an anteroposterior direction, for housing the power receiving connector body 31. Furthermore, the power supplying connector 4 includes a power supplying connector body 41 connected to the charging power supply 2a via the cable 2b and a power supplying connector housing 42, which is longitudinal in the anteroposterior direction, for housing the power supplying connector body 41 and which is fitted internally to the power receiving connector housing 32 in such a way as to be freely insertable into or removable from the power receiving connector housing 32. The power supplying connector body 41 is provided with a plurality of male terminals 43 projecting forward. These male terminals 43 fit into a plurality of female terminals provided in the power receiving connector body 31 and thereby the power supplying connector 4 is electrically connected to the power receiving connector 3.

The power supplying connector housing 42 is provided with a plurality of engagement pins 45 at circumferential intervals, which engage with annular grooves 44 formed on the outer peripheral surface of the power supplying connector body 41. This enables the power supplying connector body 41 to be relatively rotatable to the power supplying connector housing 42 and to be immovable in the anteroposterior direction. The engagement pins 45 are retained by a retaining ring 46 attached to the outer periphery of the power supplying connector housing 42.

Moreover, a cable guide 41a, which projects backward of the power supplying connector housing 42, is formed on the power supplying connector body 41 and the cable 2b is thus led out downward from the cable guide 41a. In addition, at the rear end of the cable guide 41a, there are formed a cross-sectional cross-shaped hole 41b engaging with a guide rod 64 described later and a guide projection 41c which guides the guide rod 64 into the hole 41b.

Figure 3:
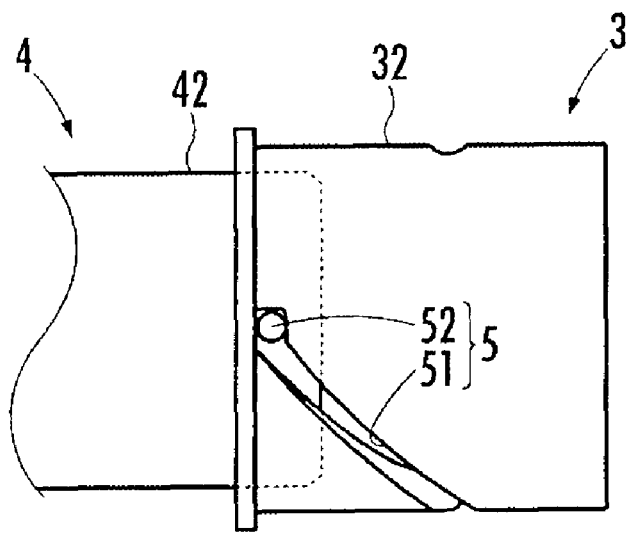
FIG. 3(a) is an explanatory diagram illustrating an unlocked state of a lock mechanism of the charging system according to the embodiment.
FIG. 3(b) is an explanatory diagram illustrating a locked state of the lock mechanism.
Figure 3:
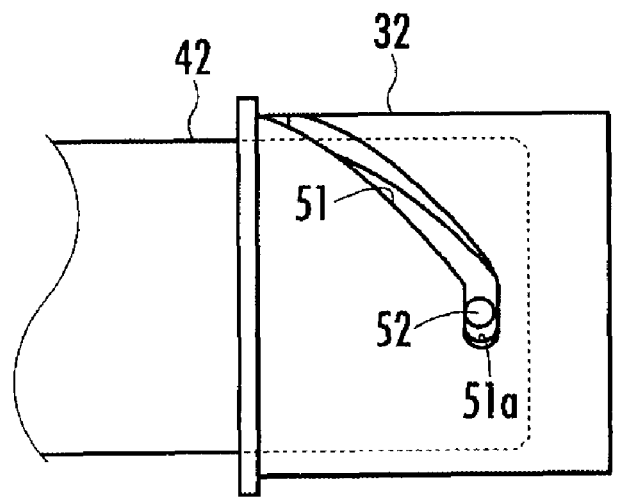

Moreover, the charging system includes a lock mechanism 5 which locks the power supplying connector 4 to be connected to the power receiving connector 3. As shown in FIG. 3, the lock mechanism 5 is formed by a cam mechanism including a spiral cam groove 51 formed on the power receiving connector housing 32 and a cam pin 52 engaging with the cam groove 51 and fixed to a portion in the vicinity of the front end of the power supplying connector housing 42. The cam groove 51 is formed at two places with a circumferential space of 180 degrees on the power receiving connector housing 32, and the cam pin 52 is provided at two places with a circumferential space of 180 degrees on the power supplying connector housing 42, too.

When the power supplying connector housing 42 is rotated in the lock direction in one circumferential direction (in the clockwise direction viewed from the left side of FIG. 3(a))

with the cam pin 52 engaging with the front end of the cam groove 51 (the state shown in FIG. 3(*a*)), the power supplying connector housing 42 moves forward relative to the power receiving connector housing 32 by the action of the cam groove 51 and thereby the power supplying connector body 41 is connected to the power receiving connector body 31.

As shown in FIG. 3(*b*), there is formed, at the rear end of the cam groove 51, a locking groove 51*a* flexing in the relative rotational direction of the cam pin 52 to the cam groove 51 when the power supplying connector housing 42 is rotated in the lock direction. When the power supplying connector housing 42 is rotated in the lock direction, the cam pin 52 finally engages with the locking groove 51*a* and then the power supplying connector 4 is locked to be connected to the power receiving connector 3. Moreover, when the power supplying connector housing 42 is rotated in an unlock direction (in the counterclockwise direction viewed from the left side of FIG. 3(*b*)) reverse to the lock direction from the state shown in FIG. 3(*b*), the power supplying connector housing 42 retracts to the power receiving connector housing 32 by the action of the cam groove 51 and thereby the power supplying connector body 41 is separated from the power receiving connector body 31.

Figure 4:
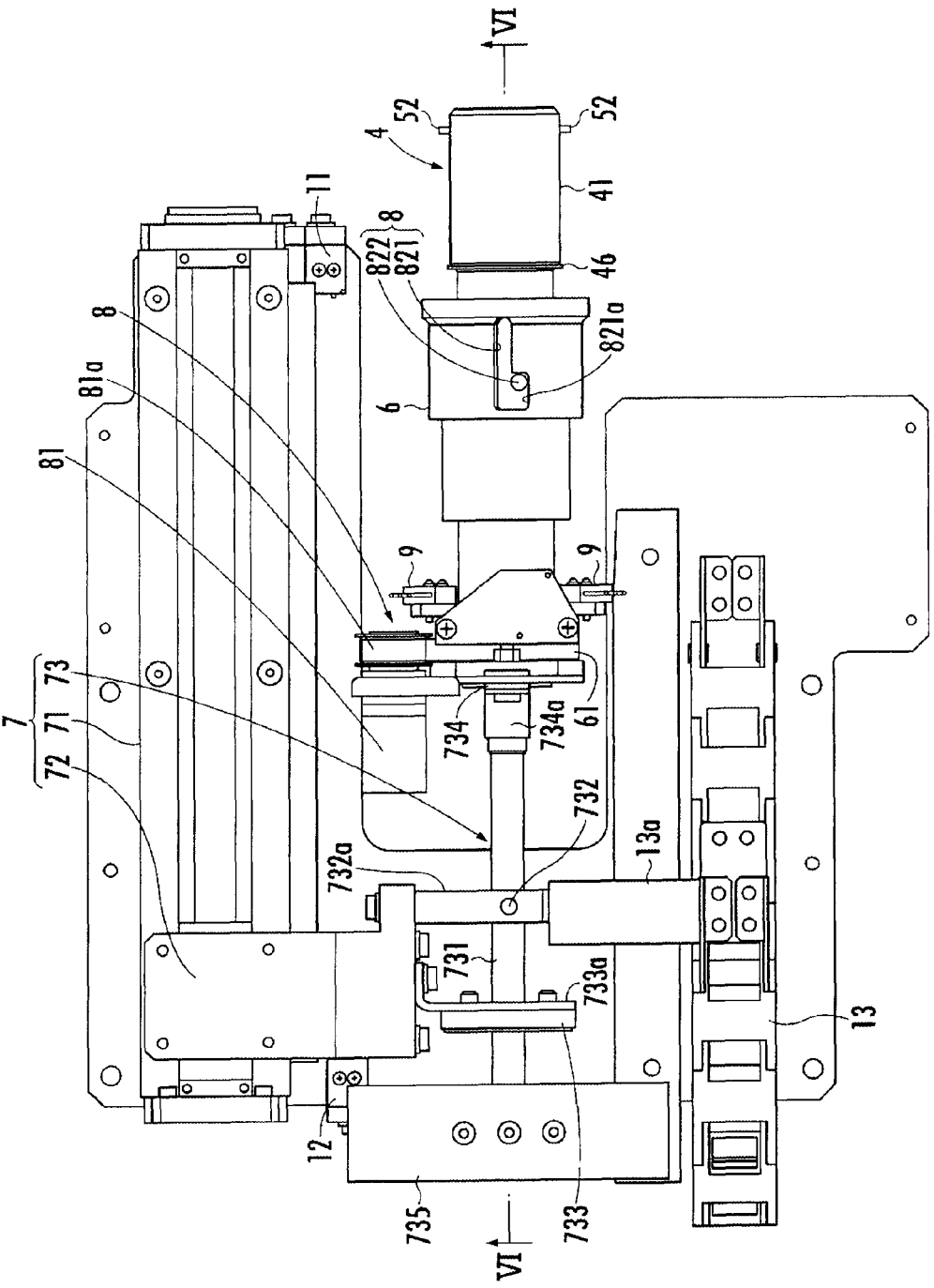
FIG. 4 is a plan view of an essential part of a charging station of the charging system according to the embodiment.
Figure 5:
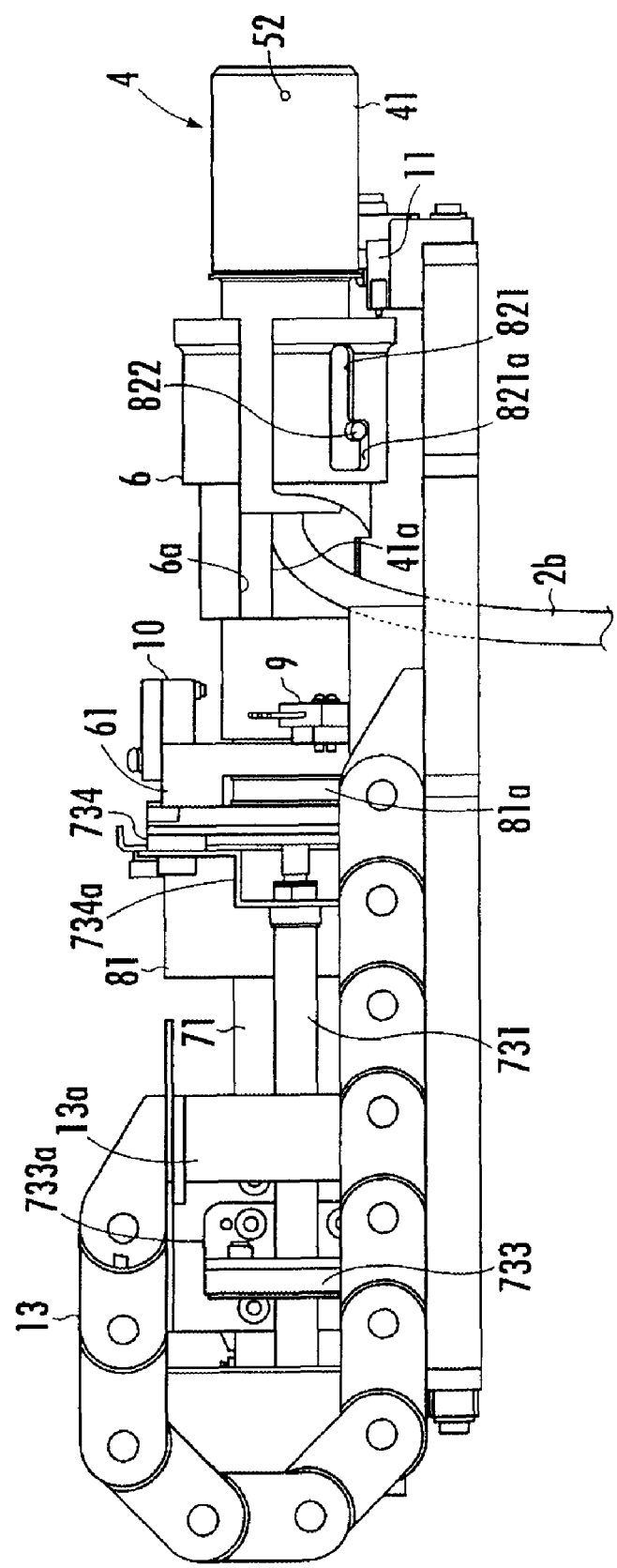
FIG. 5 is a side view of an essential part of the charging station of the charging system according to the embodiment.
Figure 6:
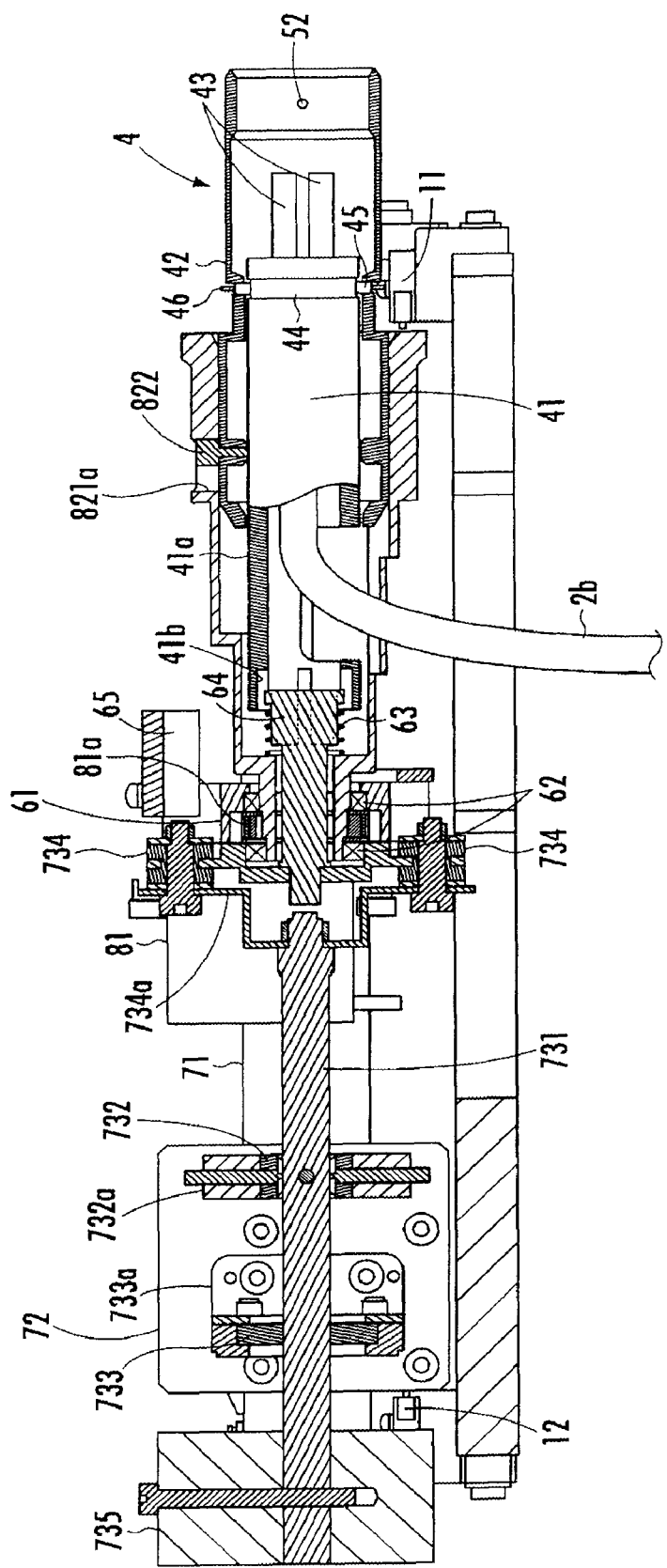
FIG. 6 is a cross section taken on line VI-VI of FIG. 4.

As shown in FIG. 4 to FIG. 6, the charging station 2 includes a connector holder 6 which holds the power supplying connector 4 detachably, an advancing/retracting mechanism 7 which advances or retracts the connector holder 6 in the anteroposterior direction, and a lock operation mechanism 8 which performs a lock operation and an unlock operation of the lock mechanism 5 via the connector holder 6.

The connector holder 6 is formed into a cylinder, which is longitudinal in the anteroposterior direction, for receiving the power supplying connector housing 42 in such a way that the power supplying connector housing 42 is freely insertable into or removable from the connector holder 6. Then, the connector holder 6 is rotatably supported at its rear end by a bearing 62 on a support frame 61 advanced and retracted by the advancing/retracting mechanism 7.

A relief hole 6*a* for the cable 2*b* is formed from the rear to the front end of the surrounding wall of the connector holder 6. This enables the connector holder 6 to be pulled out of the power supplying connector 4 without causing any interference with the cable 2*b*. Moreover, the latter half of the relief hole 6*a* is formed widely in the circumferential direction so as to rotate without causing interference with the cable 2*b*.

The lock operation mechanism 8 includes a rotary drive source 81 formed by an electric motor for rotating the connector holder 6 in the lock direction and in the unlock direction and a rotation transmission means 82 which rotates the power supplying connector housing 42 along with the rotation of the connector holder 6. The rotary drive source 81 is mounted on the support frame 61. The connector holder 6 is rotated via a belt 81*a* by means of the rotary drive source 81.

The rotation transmission means 82 includes a guide groove 821, which extends in the anteroposterior direction, formed in the connector holder 6 and a guide pin 822, which is fixed to the power supplying connector housing 42, for engaging with the guide groove 821. The rotation of the connector holder 6 is transmitted to the power supplying connector housing 42 with the relative longitudinal motion of the power supplying connector housing 42 allowed. Moreover, the guide groove 821 is formed over the front end of the connector holder 6. Therefore, it is possible to pull the connector holder 6 out of the power supplying connector housing 42 (the power supplying connector 4) without causing interference with the guide pin 822. The guide groove 821 is formed at three places with a circumferential space of 120 degrees therebetween in the connector holder 6. The guide pin 822 is also provided at three places with a circumferential space of 120 degrees therebetween in the power supplying connector housing 42, too.

There is formed a flex groove 821*a*, which flexes in the relative rotational direction of the guide pin 822 to the guide groove 821 when the connector holder 6 is rotated in the unlock direction, at the rear end of the guide groove 821 that the guide pin 822 reaches when the power supplying connector housing 42 is inserted into the connector holder 6. The anteroposterior groove length of the flex groove 821*a* is set so as to allow the guide pin 822 to move at a given stroke in the anteroposterior direction in the flex groove 821*a*. Moreover, there is provided a biasing means 63, which is formed by a coil spring abutting against the rear end of the cable guide 41*a* of the power supplying connector body 41, at the rear part of the connector holder 6. Therefore, the biasing means 63 biases the power supplying connector housing 42 forward via the power supplying connector body 41. Thereafter, the power supplying connector housing 42 is inserted into the connector holder 6, and the power supplying connector housing 42 is ready to retract by the foregoing given stroke against the biasing force of the biasing means 63 relative to the connector holder 6 in the state where the guide pin 822 is in the flex groove 821*a*.

Moreover, the guide rod 64 projecting into the connector holder 6 is fixed to the support frame 61 through the internal circumference of the rear end of the connector holder 6. The front of the guide rod 64 is formed into a cross-sectional cross shape and the front engages with the cross-sectional cross-shaped hole 41*b*, which is formed at the rear end of the cable guide 41*a* of the power supplying connector body 41. Therefore, the guide rod 64 functions as a whirl-stop means and the power supplying connector body 41 is whirl-stopped relative to the support frame 61.

The support frame 61 is further provided with a pair of rotational position sensors 9, 9 which detect a rotation of the connector holder 6 to a given locked position and unlocked position in the case of an occurrence of the rotation. The locked position here is set to a rotational position where the cam pin 52 engages with the locking groove 51*a* at the front end of the cam groove 51 and the unlocked position is set to a rotational position where the cam pin 52 engages with the rear end of the cam groove 51 and the guide pin 822 enters into the flex groove 821*a* of the guide groove 821. Moreover, the support frame 61 is provided with a robot position sensor 10 for detecting the position of the walking robot 1.

The advancing/retracting mechanism 7 includes a direct-acting type driving source 71 formed by a rodless cylinder and a movable frame 72 which is advanced and retracted in the anteroposterior direction by the direct-acting type driving source 71. Thereby, the support frame 61 which supports the connector holder 6 is connected to the movable frame 72 via a floating mechanism 73 so as to be floatable vertically or horizontally. Moreover, a tapered guide section 32*a* is formed in order to correct misalignment between the power receiving connector housing 32 and the power supplying connector housing 42 at the rear end of the power receiving connector housing 32 (See FIG. 2). Thereby, even if the power receiving connector 3 is misaligned vertically or horizontally relative to the power supplying connector 4, the power supplying connector 4 is position-controlled concentrically with the power receiving connector 3 by a vertical or horizontal floating action of the connector holder 6, which is caused by a correcting force for the misalignment generated by the guide section 32*a* when the front end of the power supplying connector housing 42 abuts against the rear end of the power receiving connector housing 32 due to the advance of the connector holder 6 caused by the advancing/retracting mechanism 7.

The floating mechanism 73 includes a rod 731, which is longitudinal in the anteroposterior direction, a universal joint 732 with a two-axis degree of freedom, which is attached to the movable frame 72 via a bracket 732a to support the rod 731 in the middle portion thereof so as to be tiltable vertically or horizontally, a first elastic support member 733, which is attached to the movable frame 72 via a bracket 733a to support the rear end of the rod 731 elastically and displaceably in the vertical or horizontal direction, and a second elastic support member 734, which is provided at the front end of the rod 731 to support the support frame 61 so as to be tiltable elastically in the vertical or horizontal direction. The first elastic support member 733 is formed by a rubber bush through which the rod 731 passes. A balance weight 735 is attached to a portion of the rod 731 projecting backward of the first elastic support member 733. Moreover, the second elastic support member 734 is formed by a pair of rubber mounts, which are attached to the front end of the rod 731 via a bracket 734a to connect the support frame 61 at two places at the top and bottom thereof.

According thereto, the correcting force for the misalignment caused by the guide section 32a causes the rod 731 to tilt around the universal joint 732 with good followability. If the support frame 61 is rigidly connected to the front end of the rod 731 in this situation, a tilt of the rod 731 causes the axis of the power supplying connector 4 to be inclined relative to the axis of the power receiving connector 3, which inhibits the power supplying connector 4 from engaging with the power receiving connector 3. On the other hand, in the above configuration, the support frame 61 tilts in a direction opposite to the tilt direction of the rod 731 due to a deformation of the second elastic support member 734 and thereby the axis of the power supplying connector 4 matches the axis of the power receiving connector 3. Therefore, it is possible to correct the misalignment between the power receiving connector 3 and the power supplying connector 4 with good followability and to connect the power supplying connector 4 to the power receiving connector 3 reliably.

On the side portion of the direct-acting type driving source 71, there are provided a forward position sensor 11 which detects that the movable frame 72 advances to a given forward position at the time thereof and a retracted position sensor 12 which detects that the movable frame 72 retracts to a given retracted position at the time thereof. Note here that the forward position is set in such a way that the cam pin 52 is engageable with the rear end of the cam groove 51 even if the power receiving connector 3 is located to some extent forward of the normal position.

Moreover, the charging station 2 is provided with a wire supporting member 13, which supports wires for the rotary drive source 81, the rotational position sensor 9, and the robot position sensor 10, in the position on the side of the floating mechanism 73. Additionally, a movable end of the wire supporting member 13 is connected to the bracket 732a for the universal joint 732 via a connecting piece 13a, so that the wire supporting member 13 moves following the movable frame 72.

Subsequently, the operation procedure for charging the battery 1b mounted on the walking robot 1 will be described below. If the remaining capacity of the battery 1b is reduced, the walking robot 1 moves to the installation location of the charging station 2 by itself, and then the power receiving connector 3 faces the front of the power supplying connector 4 by means of the motion of the walking robot 1 (the state shown in FIG. 1). If the power receiving connector 3 confirms that the power receiving connector 3 faces a given position on the front of the power supplying connector 4 by the robot position sensor 10, the direct-acting type driving source 71 that constitutes the advancing/retracting mechanism 7 advances the connector holder 6 via the movable frame 72. Thereafter, the advance is stopped when the movable frame 72 reaches the forward position detected by the forward position sensor 11.

Figure 7:
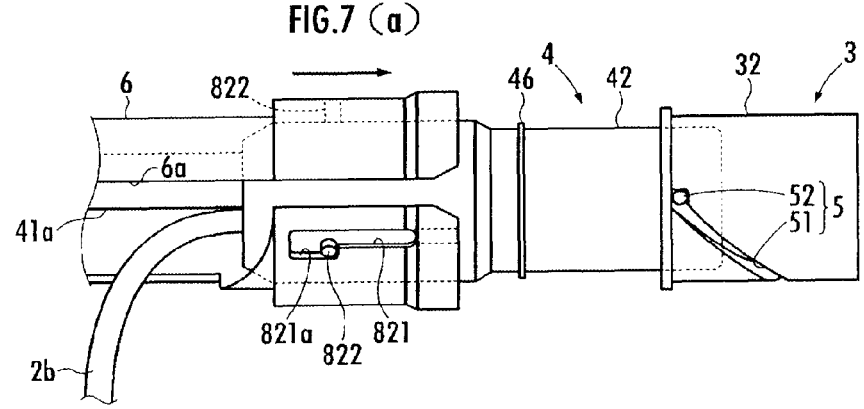
FIG. 7 is an explanatory diagram illustrating a motion of a connector holder in connecting the power supplying connector of the charging system according to the embodiment to the power receiving connector thereof.
Figure 7:
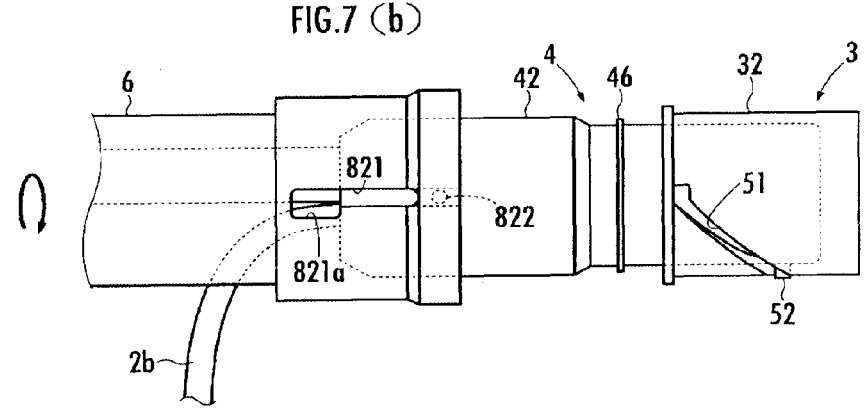
Figure 7:
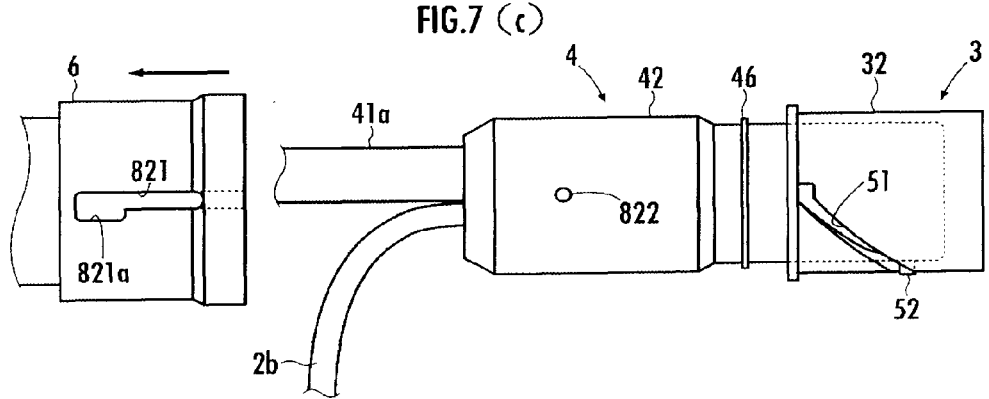

Note that the guide pin 822 fixed to the power supplying connector housing 42 is inserted into the flex groove 821a at the rear end of the guide groove 821 formed in the connector holder 6 and therefore the power supplying connector housing 42 (the power supplying connector 4) advances following the connector holder 6, too. During the advance, the position is controlled so that the power supplying connector housing 42 is concentric with the power receiving connector housing 32 by the actions of the guide section 32a formed at the rear end of the power receiving connector housing 32 and the floating mechanism 73. Therefore, as shown in FIG. 7(a), the cam pin 52 reliably engages with the rear end of the cam groove 51.

In the meanwhile, if the anteroposterior distance between the power receiving connector housing 32 and the power supplying connector housing 42 is shorter than the normal distance when the power receiving connector 3 is faced to the front of the power supplying connector 4 by the motion of the walking robot 1, the cam pin 52 engages with the rear end of the cam groove 51 in the middle of the advancing movement of the connector holder 6 and thereby the power supplying connector housing 42 does not advance any more relative to the power receiving connector housing 32. In this event, if the guide pin 822 engages with the flex groove 821a at the rear end of the guide groove 821 in such a way as to be immovable in the anteroposterior direction, a forward strong pushing force will be applied to the walking robot 1 via the power receiving connector housing 32 from the power supplying connector housing 42 due to a subsequent advance of the connector holder 6, and thus the walking robot 1 could be pushed down forward.

For this situation, the guide pin 822 is freely movable at a given stroke in the anteroposterior direction within the flex groove 821a of the guide groove 821 in this embodiment, and therefore the power supplying connector housing 42 is capable of retracting by the given stroke against the biasing force of the biasing means 63 relative to the connector holder 6 as described above. Accordingly, if the cam pin 52 engages with the rear end of the cam groove 51 in the middle of the advancing movement of the connector holder 6, the power supplying connector housing 42 retracts relative to the connector holder 6. This prevents the forward strong pushing force from being applied to the walking robot 1.

After the stop of the advance of the movable frame 72 (the connector holder 6), the lock operation mechanism 8 subsequently performs a lock operation of the lock mechanism 5. More specifically, the rotary drive source 81 rotates the connector holder 6 in the lock direction until the rotational position sensor 9 detects that the connector holder 6 reaches the locked position. With the rotation of the connector holder 6 in the lock direction, the guide pin 822 is pulled out of the flex groove 821a, which allows the power supplying connector housing 42 to advance relative to the connector holder 6, and the power supplying connector housing 42 rotates in the lock direction due to the transmission of the turning force via the guide groove 821 and the guide pin 822. Then, as shown in FIG. 7(b), the power supplying connector housing 42 advances relative to the power receiving connector housing 32 due to the action of the lock mechanism 5 including the cam groove 51 and the cam pin 52. When the connector holder 6 is rotated up to the locked position, the cam pin 52 engages with the locking groove 51a at the front end of the cam groove 51, by which the power supplying connector 4 is locked to be connected to the power receiving connector 3.

Note that the power supplying connector body 41 is relatively rotatable with respect to the power supplying connector housing 42, and therefore the power supplying connector body 41 does not rotate accompanying the rotation of the power supplying connector housing 42. Moreover, the guide rod 64 which is the whirl-stop means fixed to the support frame 61 is not pulled out of the hole 41b at the rear end of the power supplying connector body 41 until the male terminals 43 of the power supplying connector body 41 begin to engage with the female terminals of the power receiving connector body 31. Thereby, the power supplying connector body 41 is maintained in a phase where the male terminals 43 are engageable with the female terminals of the power receiving connector body 31. Therefore, the power supplying connector body 41 is reliably connected to the power receiving connector body 31 by the advance of the lock mechanism 5 of the power supplying connector housing 42 and is locked to this state.

Subsequently, it is confirmed that the power supplying connector body 41 is connected to the power receiving connector body 31 by means of a communication between signal terminals disposed in the power receiving connector body 31 and the power supplying connector body 41. Upon confirmation of the connection, the walking robot 1 sends a specification of a charging condition to the charging station 2 via the signal terminal and then the charging power supply 2a starts to charge the battery 1b under the specified condition.

Moreover, upon confirmation of the connection between the power supplying connector body 41 and the power receiving connector body 31, the direct-acting type driving source 71 retracts the movable frame 72 up to the retracted position detected by the retracted position sensor 12 after or before starting the charge. Thereby, as shown in FIG. 7(c), the connector holder 6 is retracted and pulled out of the power supplying connector housing 42 (the power supplying connector 4). In this state, the power supplying connector 4 is connected to the charging station 2 only via the cable 2b. Therefore, it is possible to freely move the walking robot 1 within the range as long as the cable 2b is not stretched completely with the power supplying connector 4 connected to the power receiving connector 3. Therefore, it is possible to effectively show the entertainment ability of the walking robot 1 also during charging and thereby to entertain viewers.

Upon completion of the charge of the battery 1b, the walking robot 1 sends a charge stop signal to the charging station 2 via the signal terminal and then the charge is stopped. After the stop of the charge, the direct-acting type driving source 71 advances the connector holder 6 via the movable frame 72. Thereby, the guide pin 822 engages with the front end of the guide groove 821 and then the state shown in FIG. 7(b) is resumed.

Subsequently, the lock operation mechanism 8 performs an unlock operation of the lock mechanism 5. More specifically, the rotary drive source 81 rotates the connector holder 6 in the unlock direction until the rotational position sensor 9 detects that the connector holder 6 reaches the unlocked rotational position. Thereby, the power supplying connector housing 42 rotates in the unlock direction with the transmission of the turning force via the guide groove 821 and the guide pin 822. Then, the power supplying connector housing 42 retracts relative to the power receiving connector housing 32 by the action of the lock mechanism 5 including the cam groove 51 and the cam pin 52, by which the power supplying connector body 41 is separated from the power receiving connector body 31. Moreover, the power supplying connector housing 42 is inserted into the connector holder 6 and the guide pin 822 is finally inserted into the flex groove 821a at the rear end of the guide groove 821, by which the state shown in FIG. 7(a) is resumed.

Subsequently, the direct-acting type driving source 71 retracts the connector holder 6 via the movable frame 72. Thereby, the power supplying connector housing 42 (the power supplying connector 4) is pulled out of the power receiving connector housing 32 (the power receiving connector 3) and the state shown in FIG. 1 is resumed. Thereby, the walking robot 1 becomes completely free.

While the preferred embodiment of the present invention has been described with reference to accompanying drawings, it is to be understood that the subject matter encompassed by the present invention is not limited to the specific embodiment. For example, although the cam groove 51 constituting the lock mechanism 5 has been formed on the power receiving connector housing 32 and the cam pin 52 has been fixed to the power supplying connector housing 42 in the above embodiment, it is possible to form the cam groove on the power supplying connector housing 42 and to fix the cam pin to the power receiving connector housing 32. Moreover, although the guide groove 821 constituting the rotation transmission means 82 has been formed on the connector holder 6 and the guide pin 822 has been fixed to the power supplying connector housing 42 in the above embodiment, it is possible to form the guide groove on the power supplying connector housing 42 and to fix the guide pin to the connector holder 6.

Moreover, it is also possible to form the lock mechanism 5 by attaching a movable lock member, which is engageable with and disengageable from one of the power receiving connector 3 and the power supplying connector 4, to the other connector. This makes the structure of the lock mechanism 5 complicated and further makes the structure of the lock operation mechanism 8 complicated, thereby increasing the cost. On the other hand, if the lock mechanism 5 is formed by a cam mechanism including the cam groove 51 and the cam pin 52 as described in the above embodiment, the structure of the lock mechanism 5 is simplified and only the rotation of the connector holder 6 enables the lock operation and unlock operation of the lock mechanism 5 and therefore the structure of the lock operation mechanism 8 is also simplified, which is advantageous to reduce the cost.

What is claimed is:

1. A charging system for a walking robot which is provided with a charging station including a charging power supply and a power supplying connector connected thereto via a cable and which charges a battery mounted on the walking robot from the charging power supply by connecting the power supplying connector to a power receiving connector provided in the walking robot, the charging system comprising a lock mechanism capable of locking the power supplying connector to be connected to the power receiving connector, wherein the charging station is provided with a connector holder which holds the power supplying connector detachably, an advancing/retracting mechanism which advances and retracts the connector holder in an anteroposterior direction, and a lock operation mechanism which performs a lock operation and an unlock operation of the lock mechanism via the connector holder, with a connecting direction of the power supplying connector to the power receiving connector defined as a front side and a reverse direction defined as a rear side.

2. The charging system according to claim 1, wherein the advancing/retracting mechanism includes a direct-acting type driving source and a movable frame which is advanced and retracted in the anteroposterior direction by the direct-acting type driving source, wherein a support frame which supports the connector holder is connected to the movable frame so as to be floatable vertically or horizontally via a floating mechanism, and wherein at least one of the power supplying connector and the power receiving connector is provided with a guide section for correcting misalignment between the power supplying connector and the power receiving connector.

3. The charging system according to claim 2, wherein the floating mechanism includes a rod longitudinal in the anteroposterior direction, a universal joint which is provided in the movable frame to support the rod in a middle portion thereof so as to be tiltable vertically or horizontally, a first elastic support member which is provided in the movable frame to support a rear end of the rod elastically and displaceably in a vertical or horizontal direction, and a second elastic support member which is provided at a front end of the rod to support the support frame so as to be tiltable elastically in the vertical or horizontal direction.

4. The charging system according to claim 1, wherein the power receiving connector includes a power receiving connector body connected to the battery and a cylindrical power receiving connector housing which is longitudinal in the anteroposterior direction to house the power receiving connector body, wherein the power supplying connector includes a power supplying connector body connected to the charging power supply via the cable and a power supplying connector housing which is formed into a cylinder longitudinal in the anteroposterior direction to house the power supplying connector body so as to be relatively rotatable and which is freely insertable into or removable from the power receiving connector housing, wherein the connector holder is formed into a cylinder longitudinal in the anteroposterior direction to receive the power supplying connector housing so that the power supplying connector housing is freely insertable into and removable from the connector holder and is rotatably supported by a support frame advanced and retracted by the advancing/retracting mechanism, wherein the lock mechanism, which has a spiral cam groove formed on one of the power supplying connector housing and the power receiving connector housing and a cam pin engaging with the cam groove and fixed to the other of the power supplying connector housing and the power receiving connector housing, includes a cam mechanism which connects the power supplying connector body to the power receiving connector body by advancing the power supplying connector housing relative to the power receiving connector housing when the power supplying connector housing is rotated in a lock direction which is one circumferential direction and pulls the power supplying connector body out of the power receiving connector body by retracting the power supplying connector housing relative to the power receiving connector housing when the power supplying connector housing is rotated in an unlock direction which is another circumferential direction, and wherein the lock operation mechanism includes a rotary drive source which rotates the connector holder in the lock direction and in the unlock direction and a rotation transmission means which rotates the power supplying connector housing along with the rotation of the connector holder.

5. The charging system according to claim 4, wherein the rotation transmission means includes a guide groove extending in the anteroposterior direction, which is formed in one of the connector holder and the power supplying connector housing, and a guide pin engaging with the guide groove, which is fixed to the other of the connector holder and the power supplying connector housing, wherein there is formed a flex groove, which flexes in a relative rotational direction of the guide pin to the guide groove when the connector holder is rotated in the unlock direction, at an end of the guide groove that the guide pin reaches when the power supplying connector housing is inserted into the connector holder, and the anteroposterior groove length of the flex groove is set so as to allow the guide pin to move by a given stroke in the anteroposterior direction in the flex groove, and wherein there is provided a biasing means which biases the power supplying connector housing forward relative to the connector holder.

6. The charging system according to claim 4, further comprising a whirl-stop means which stops a whirl of the power supplying connector body relative to the support frame.

7. A charging method for a walking robot using a charging system for the walking robot, which is provided with a charging station including a charging power supply and a power supplying connector connected thereto via a cable and which charges a battery mounted on the walking robot from the charging power supply by connecting the power supplying connector to a power receiving connector provided in the walking robot, wherein the charging system includes a lock mechanism capable of locking the power supplying connector to be connected to the power receiving connector and the charging station is provided with a connector holder which holds the power supplying connector detachably, an advancing/retracting mechanism which advances and retracts the connector holder in an anteroposterior direction, and a lock operation mechanism which performs a lock operation and an unlock operation of the lock mechanism via the connector holder, with a connecting direction of the power supplying connector to the power receiving connector defined as a front side and a reverse direction defined as a rear side, the charging method comprising the steps of:

causing the power receiving connector to face the front of the power supplying connector by means of a motion of the walking robot;

advancing the connector holder by the advancing/retracting mechanism with the power supplying connector held by the connector holder;

locking the power supplying connector to be connected to the power receiving connector by performing a lock operation of the lock mechanism by means of the lock operation mechanism;

charging the battery mounted on the walking robot from the charging power supply;

pulling the connector holder out of the power supplying connector by retracting the connector holder by the advancing/retracting mechanism before or after starting the battery charge;

advancing the connector holder by the advancing/retracting mechanism after completion of the battery charge;
releasing the lock of the power supplying connector to the power receiving connector by performing an unlock operation of the lock mechanism by means of the lock operation mechanism to cause the connector holder to hold the power supplying connector; and
retracting the connector holder by the advancing/retracting mechanism to pull the power supplying connector out of the power receiving connector.

* * * * *